United States Patent [19]

Mutke

[11] 4,071,210

[45] Jan. 31, 1978

[54] ARRANGEMENT FOR THE TRANSPORTATION OF PERSONS IN A RECUMBENT POSITION IN PARTICULAR IN AIRCRAFT

[76] Inventor: H. Guido Mutke, Drygalski Allee 117, 8000 Munich 71, Germany

[21] Appl. No.: 729,993

[22] Filed: Oct. 6, 1976

[30] Foreign Application Priority Data

July 5, 1976 Germany .............................. 2630210

[51] Int. Cl.² ...................... A47C 19/20; B61D 31/00; B64D 11/00
[52] U.S. Cl. .................................. 244/118 P; 5/9 R; 105/314; 296/19
[58] Field of Search ........................ 244/118 P, 137 P; 5/9 R, 9 B, 113, 332; 105/314, 315, 316; 296/19

[56] References Cited

U.S. PATENT DOCUMENTS

| 693,822 | 2/1902 | Crane | 296/19 |
|---|---|---|---|
| 2,124,003 | 7/1938 | McDonnell et al. | 244/118 P |
| 3,118,399 | 1/1964 | Sarkus | 5/332 |
| 3,330,506 | 7/1967 | Robillard et al. | 244/118 P |
| 3,358,300 | 12/1967 | Smith | 5/9 R |
| 3,784,989 | 1/1974 | LeGrand | 244/118 P |
| 3,813,714 | 6/1974 | Sater | 5/332 |
| 3,848,279 | 11/1974 | Ipsen | 5/113 |

FOREIGN PATENT DOCUMENTS 614,681 2/1934 Germany .............................. 296/19

Primary Examiner—Trygve M. Blix
Assistant Examiner—Charles E. Frankfort
Attorney, Agent, or Firm—Krass & Young

[57] ABSTRACT

A rack-like sleeping apparatus for aircraft passengers comprising a frame having multiple spaced sliding couches with open end or side panels, and folding tables. The frame comprises a plurality of vertically-spaced longitudinal side rails, integrated by vertical corner posts and cross rails to form a unitary, torsionally stiff structure. Each rack is subdivided into three vertically-stacked compartments, separated from one another by panels. A couch is longitudinally slidably disposed in each compartment by means of rollers which interfit with the side rails. The tables are also longitudinally slidably mounted on mediate side rails in each compartment, and are detachable from one side. The entire rack is mounted on rollers and has an upper attachment means for securement within an aircraft.

10 Claims, 6 Drawing Figures

ARRANGEMENT FOR THE TRANSPORTATION OF PERSONS IN A RECUMBENT POSITION IN PARTICULAR IN AIRCRAFT

INTRODUCTION

The invention relates to an arrangement for the transportation of persons in a recumbent position in particular in aircraft in compartments arranged above each other.

BACKGROUND OF THE INVENTION

The requirement arises frequently in traffic engineering to transport persons over very long distances, which requires a time in the order of magnitude of ten hours or more. In railroad engineering, sleeping compartments have been provided for this purpose, which contain one or more beds over each other and in which eventually several groups of lying support surfaces are provided on walls situated opposed to each other.

In this known principle of transportation of persons in a recumbent position, one starts out from a relatively large available space. In recent times however, air transportation too has developed to such an extent, that many passengers can be transported with large capacity aircraft over very long distances and thus the problem arises here too to create greater comfort and healthier conditions of transportation. Actually it is customary to provide adjustable passenger seats in aircraft which make it possible for the passenger to assume a semirecumbent position. On long distance flights with a flying time in the order of magnitude of ten hours, however, such passenger seats are totally inadequate, and the unnatural body position in itself, leads to extreme exhaustion, if not to health damage of the passengers.

It is true that sleeping bunks have been built into aircraft, similarly as in ship building to make a rest for the crew possible on long duration flights. However, the application of this principle is out of question for the passengers to be carried, as fixed, built-in sleeping bunks would on the one hand increase the flying weight considerably, and on the other hand would essentially limit the possible number of passengers to be transported.

SUMMARY OF THE INVENTION

It is the purpose of the invention to present an arrangement, which is suitable for the transportation of persons in the recumbent position, in particular in aircraft, and which can be easily exchanged so that transportation of persons in a recumbent or sitting position can be chosen depending on the time of day, or, in particular in case of large capacity aircraft even both modes of transportation can be realized. In this a weight increase should be avoided as far as possible.

For the solution of this problem an arrangement of the kind mentioned at the beginning, is characterized according to the invention, by a frame-like rack, provided with upper and lower anchoring elements, which is subdivided into compartments, disposed above each other and foreseen in each case for one person, and which contains in each compartment a couch which is preferably adjustable with regard to support surface and weight of the head rest, and which is, at least partially slidingly movable out of the rack.

This arrangement can be easily exchanged, particularly in aircraft against an already existing seating arrangement, because the frame-like structure has a relatively lower weight and can, for instance, be installed, like a freight container, in the passenger space of an aircraft. For this the upper and lower anchoring elements are attached to corresponding places of the passenger space. In the base area such a rack does not occupy more than a row of seats consisting of about three seats, and the available height in aircraft is so great, that at least three compartments being located above each other can be accommodated in one rack. The wall of this rack can consist of a fabric covering or also of light metal or plastic plates. In case the rack has several compartments arranged above each other, a couch can be provided in each compartment, in the way it is also used in railroad engineering in sleeping compartments in appropriate number for several persons. Such couches can be made in a very light construction, so that a container formed by a frame-like rack with three compartments does certainly not present a higher total weight than a seating group consisting of three seats, to be provided in its place in an aircraft.

Each couch can be displaced slidably at least partly, out of the rack, in its longitudinal direction. By this it is made possible for the passenger to occupy his place easily and comfortably and push himself, together with the couch, back into the rack. The couch is preferably adjustable with regard to the support surface and the head support height, so that it is possible to occupy in each case the best and most comfortable recumbent position within each individual compartment.

An arrangement according to the invention enables therefore the rapid refitting of the craft, particularly of aircraft for the recumbent transportation of persons. Thereby it becomes possible, especially on voyages with very long travelling time to improve the well-being of the passengers and thereby to avoid health damage.

The frame-like rack is also suitable to fulfill high requirements of safety, because the passengers are protected in it from all sides against impact and shock effects, as the rack is very stable and torsion resistant on account of its frame-like construction.

The frame-like rack has preferably a base area corresponding approximately to that of the couch and is closed on all sides with the exception of one narrow side and/or one longitudinal side. The narrow side forms the openings for the partial sliding out of the couches. Additionally or alternatively it is also possible to have one longitudinal side of the rack open, so that in this case entry into the compartments from the side becomes possible. This depends in each case on the mounting of the racks in a craft, as several racks can be placed against each other with their longitudinal sides, or it is also possible to arrange the racks in a row with their narrow sides and leave them open on one side. The actual manner of assembly of such racks depends in each case obviously on the available space.

The wall surfaces of the frame-like racks can be made, as has already been explained, of a rigid material. They are suitably provided on at least one side with an opening, which, for instance, is closable by a slider or a curtain. This makes the mutual contact of persons in adjoiningly arranged compartments of the two racks possible. If the wall surfaces are made of flexible material, at least one side wall of each compartment is suitably fitted with a part which can be opened by means of a slide fastener.

In each individual compartment, the couch can be supported slidably, by means of guide rollers, on profile rails along both sides and forming part of the frame-like rack. This makes an easy and smooth sliding motion possible, without the requirement for an excessive action of force.

In addition to the couch, a table, preferably adjustable in its inclination, can be provided in each compartment and be movable, by choice, into the region over a person lying on the couch. The table is guided to advantage slidably, in longitudinal direction of each compartment, on profile rails at both sides, appertaining to the rack. Besides, it can be folded into a vertical position on the profile rails guiding it. For this the table is appropriately detachable from one of the profile rails and attached to the other profile rail, being tiltable into a position adjoining the sidewall of the compartment.

The rack is preferably provided with a connection common for the compartments, and designed in the manner of multiple connector plugs for the supply of fresh air and/or electrical current into the compartments. This makes it possible to obtain, in the same manner as for instance in the region of the passenger seats in aircraft, an individual lighting as well as an optional supply with fresh air.

An example of execution of the arrangement according to the invention will be described in the following with the aid of figures.

BRIEF DESCRIPTION OF THE SPECIFIC EMBODIMENT

DETAILED DESCRIPTION OF THE SPECIFIC EMBODIMENT

Figure 1:
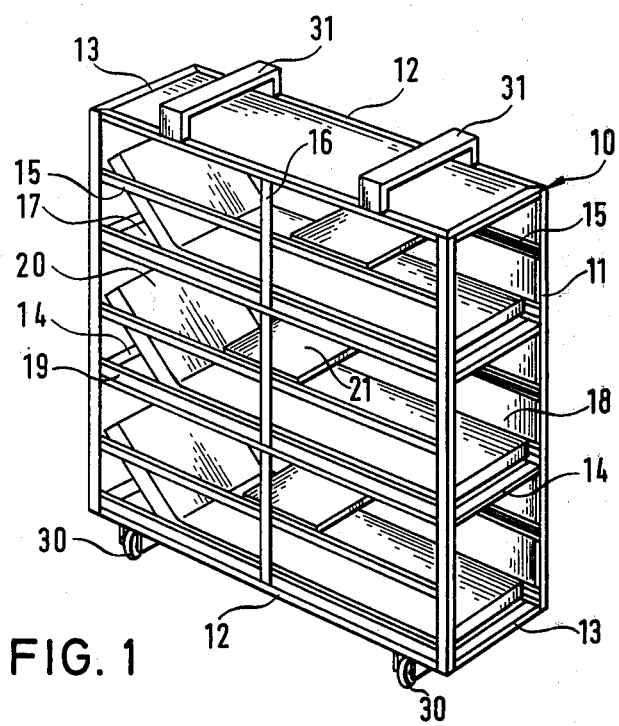
FIG. 1 is a first perspective side view of an arrangement according to the invention.

A frame-like rack 10, constructed of vertical rails 11, horizontal longitudinal rails 12 and horizontal cross rails 14 is shown in perspective in FIG. 1. There are further provided, at about the middle height of each compartment, additional horizontal longitudinal rails 15, which serve for the guiding of a folding table 21, yet to be described. Besides, middle vertical rails 16 are foreseen for stiffening the entire rack. The rack is thus of a totally rigid and twist-free construction.

In the shown example of execution, the rack contains three bottom surfaces 17, by which it is subdivided into three compartments lying above each other. These compartments are accessible through openings 18 on one of the narrow sides of the rack. Longitudinal rails 19 for a couch 20 are provided in each compartment. This couch 20 is guided in the longitudinal rails on rollers in a manner yet to be described. Each couch 20 has assigned to it a folding table 21, which can be displaced within each compartment on longitudinal rails 15.

On its bottom side the rack has anchoring elements in the shape of rollers 30, on its top side anchoring elements in the shape of brackets 31. By means of these anchoring elements the rack can be mounted, for instance in the passenger space of an aircraft.

Figure 2:
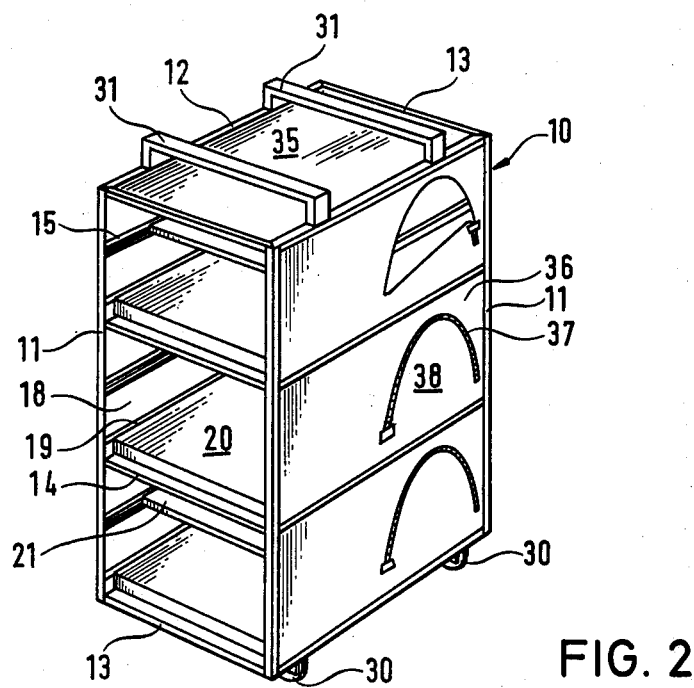
FIG. 2 is a second perspective side view of an arrangement according to the invention.

For a better general view, the rack is presented with one opened side in FIG. 1. A closed covering surface 35 and a closed side surface 36 which, for instance, can consist of a strong material, are shown in FIG. 2. However, it is possible in the same manner, to make the covering and side surfaces of the rack also from a rigid material, such as for instance light metal, wood or plastic.

For the case of execution of the side walls in cloth, FIG. 2 shows the side walls 36 of the individual compartments fitted with slide fasteners 37, which can expose an opening for each compartment. This can be, for instance, seen for the uppermost compartment in FIG. 2, on side wall 36. For this, part 38, which is surrounded in a semi-circle by the slide fastener 37, is folded in a simple way inward or outward.

Figure 3:
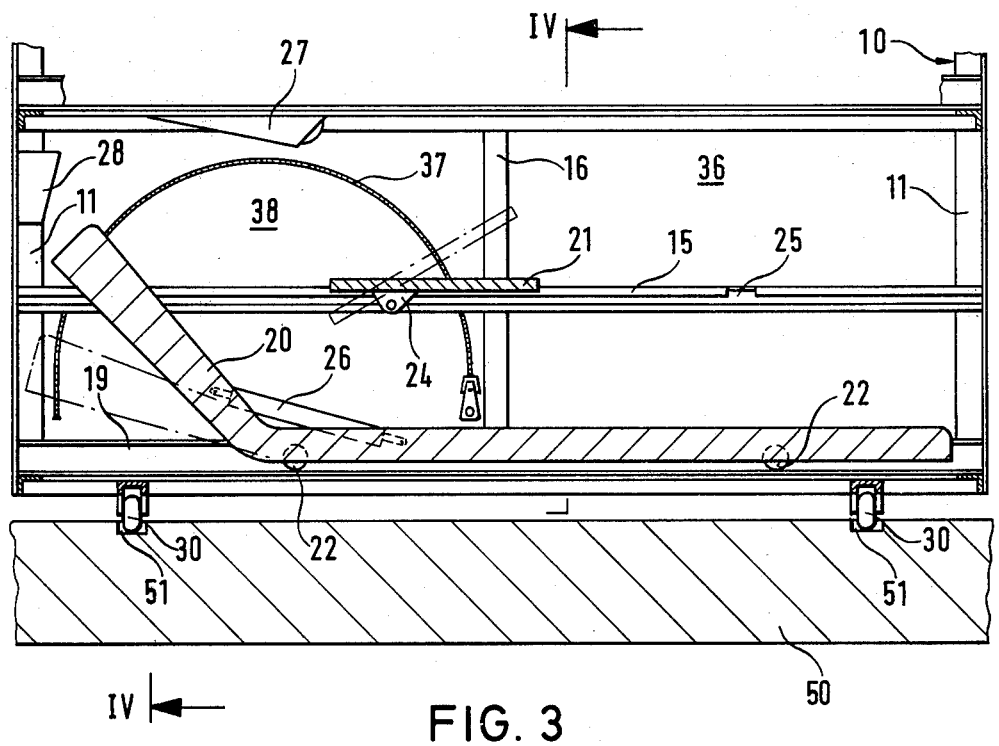
FIG. 3 is a partial section of the arrangement according to the invention for the clearer presentation of a compartment.

FIG. 3 shows the longitudinal section of the lower compartment of the rack shown in FIGS. 1 and 2. It can be seen how the couch is guided in the longitudinal rails 19 by means of rollers 22. Moreover, the folding table 21 is shown in the horizontal position in solid lines and in an inclined position in broken lines. It can be recognized that the folding table 21 is guided in the longitudinal rail 15 on a support 24. This longitudinal rail 15 has a cut-out at 25, which makes it possible to move the folding table 21 up to the point 25, and then to tilt it out of the longitudinal rail 15, together with its support, so that it is then attached in a vertical position on the other longitudinal rail, not shown in FIG. 3, where it can be anchored.

The couch 20 is shown in FIG. 3 with its head end in a strongly inclined position in solid lines, while it is shown in a less inclined position in broken lines. For adjustment of this inclination, for instance, a hydraulically or spring power actuated adjustment device 26 can be foreseen. Besides that, also a lighting unit 27, aimed at the region of the folding table 21, is shown on the upper side of the compartment, presented in FIG. 3. At the left narrow side, that is, behind the head of a person situated on the couch 20, an operating panel 28 can be provided which makes possible the adjustment of fresh air nozzles, not shown in the drawing, the operation of a signalling device, connection of an apparatus for electrical sleep inducement, for instance sleeping goggles, etc.

Shown further in FIG. 3 is the guiding of the rack 10 with the lower rollers 30 in rails 51 of a floor of a craft 50. Movement of the rack on the rails 51 occurs in a plane at right angle to the plane of the drawing. If several racks are installed in succession in this direction, it becomes possible to fold the part 38, semi-circularly enclosed by slide-fastener 37, of side wall 36, shown in FIG. 3, after opening slide fastener 37, toward the inside and thus make contact with a person present in the next rack.

Figure 4:
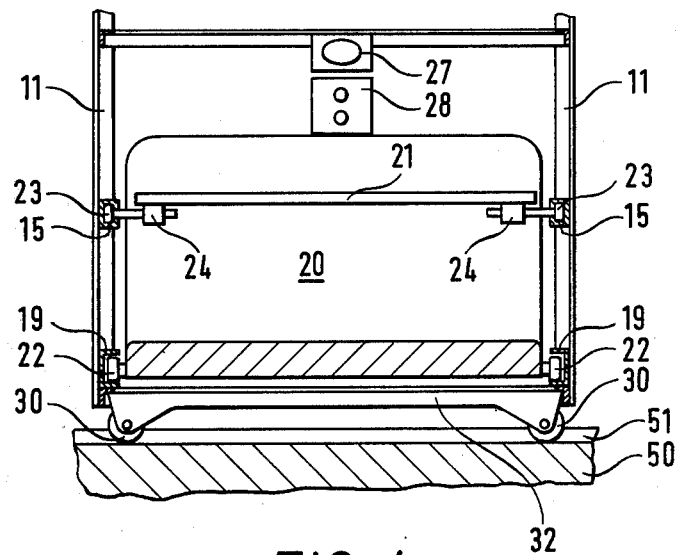
FIG. 4 is the section IV — IV from FIG. 3.

FIG. 4 shows the section IV—IV of FIG. 3. It can be recognized that the couch 20 with its rollers 22 is guided on both sides in longitudinal rails 19, which are of U-section. Similarly the folding table 21 with its supports 24 is guided in longitudinal rails 15 on both sides. For this, also rollers 23 can be provided which are connected to the supports 24. The guide rails 15 likewise are made of U-sections or box beam sections. Shown further in FIG. 4 is the disposition of the lighting unit 27 and of the operating panel 28 at the center of the narrow side of the compartment at a height of somewhat above the head of a person present on the couch 20.

The lower rollers 30 are attached to roller carriers 32, which extend across the width of the rack, and affixed to its lower bottom. When the rack is anchored in the space of a craft by the upper holding brackets shown in FIG. 1, it is immovably fixed, because its lower rollers 30 can only move in the rails 51 of the floor 50 in the longitudinal direction of the rails, but not crosswise to it.

Figure 5:
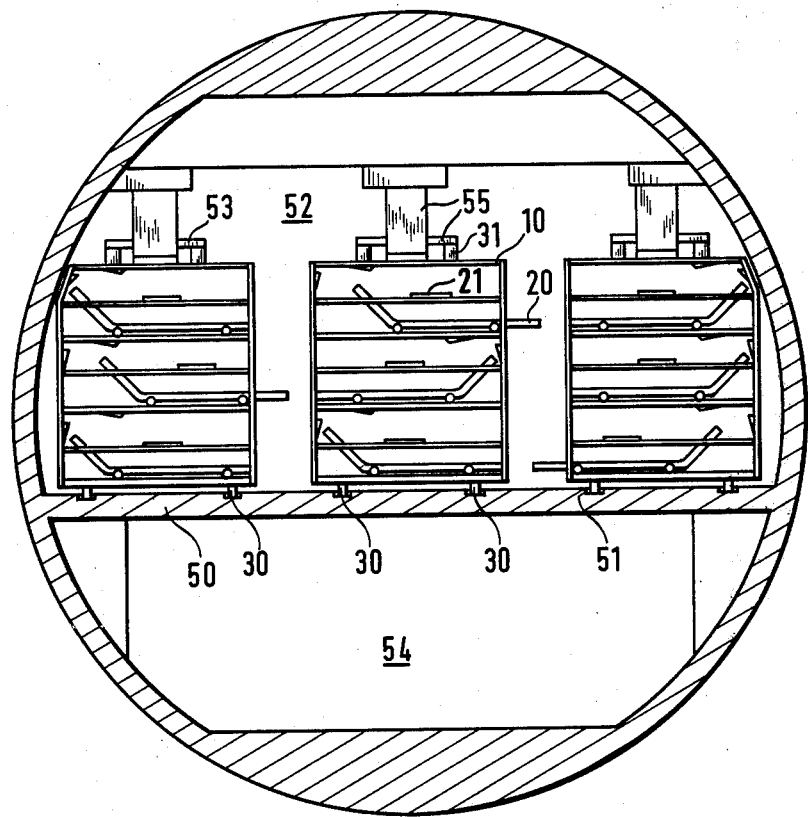
FIG. 5 is a possible manner of disposition of arrangements according to the invention, in the passenger space of a large capacity aircraft.

The cross section of the passenger space of an aircraft cell is presented in FIG. 5. The floor 50 subdivides the total available cell space into the passenger deck 52 and the freight space 54. In the presented example the passenger space 52 is so wide, that three rows of rack 10 can be disposed and a passageway is left open between each two rows of racks, through which the individual compartments of the racks 10 are accessible. The racks are attached with their lower rollers 30 in the rails 51, with their upper holding brackets 31 on supports 55. This fastening can be performed, for instance, with rapid fasteners known for such purposes.

Some of the couches 20 are presented in their position when slid out of the racks 10. The upper compartments can, for instance, be reached by light weight ladders, which are not shown in FIG. 5 and are to be attached to the vertical edge of each rack in question.

When not in use, such ladders can be stored in each case between two racks.

Figure 6:
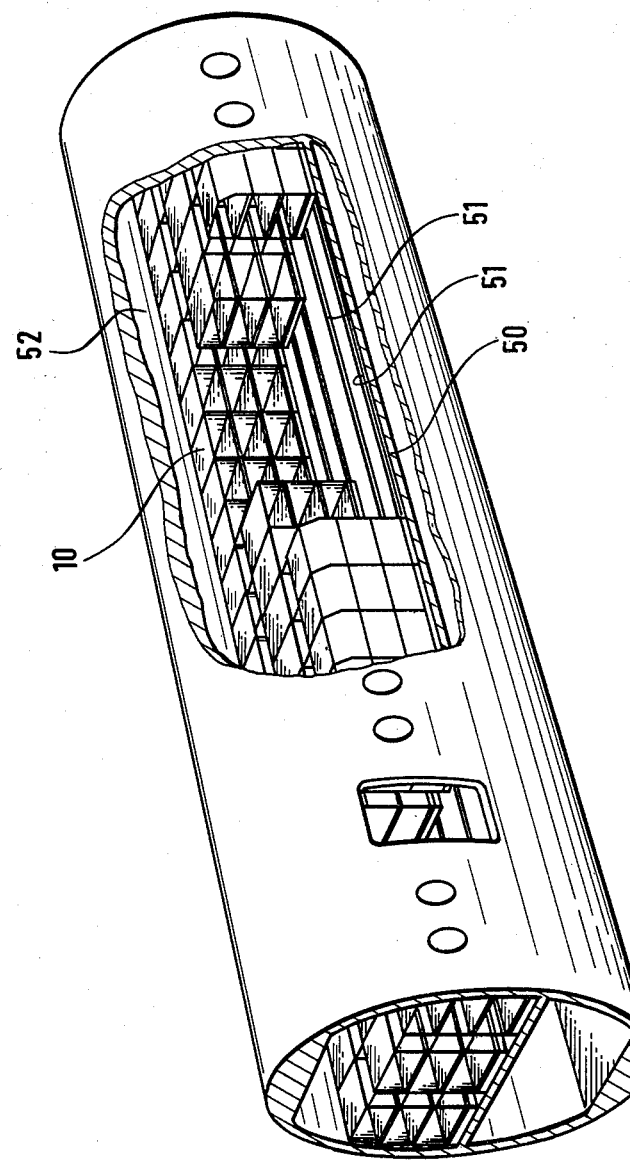
FIG. 6 is a perspective, partially sectional presentation of part of an aircraft cell for the clarification of the disposition of arrangements, according to the invention, in the passenger space.

FIG. 6, finally, shows the disposition of a plurality of racks 10 in the cell of an aircraft, which is shown partly cut-off. The racks 10 are shown schematically disposed in a row, and in conformity with the presentation in FIG. 5, three rows of racks are foreseen. The rails 51 run in the longitudinal direction of the cell and serve customarily for the fastening of passenger seating groups on the floor 50. The entire passenger space 52 can be filled in the manner shown with rows of racks, however, it is also possible to provide passenger seats in certain sections of the aircraft cell. In FIG. 6 it can be recognized, that the racks 10, which are disposed directly on one side of the passenger space 52, are bevelled at their upper corner, oriented toward this side, in order to utilize the available space as well as possible. Such bevels can also be recognized in the sectional view presented in FIG. 5.

I claim:

1. A unitized multiple passenger sleeping apparatus for expedited installation and removal in transportation bodies such as aircraft and the like and comprising:

a rack structure including the substantially integral combination of plural vertically spaced and longitudinally oriented rails, corner posts and cross rails, said longitudinal rails defining the lateral boundaries of said structure;

means extending between first laterally opposite pairs of longitudinal rails for sub-dividing said rack structure into a plurality of mutually exclusive, parallel, and vertically spaced passenger compartments;

a plurality of couches equal in number to the number of compartments and being individually disposed in said compartments immediately adjacent said sub-dividing means;

means displaceably supporting each of said couches between said first pairs of longitudinal rails whereby each couch may be at least partially displaced longitudinally out of the associated compartment;

and separate means disposed on the top and bottom of said rack structure for anchoring said structure within the interior of said transportation body, said means disposed on the bottom of said rack structure comprising guide rollers co-operable with suitable tracks mounted within the interior of said transportation body to permit rolling of said rack structure along an axis which is perpendicular to the longitudinal axis of said rack structure.

2. A unitized sleeping apparatus as defined in claim 1 wherein said first longitudinal rails are of U-shaped cross section to define roller channels, the means supporting said couches therebetween comprising rollers secured to the sides of said couches and extending into said channels to be supported thereby.

3. A unitized multiple passenger apparatus as defined in claim 1 wherein said plurality of longitudinal rails comprises second laterally opposite pairs of rails disposed at vertically intermediate locations relative to each compartment, and a plurality of tables, equal in number to the number of compartments, each table being longitudinally displaceably supported between a second rail pair to extend across a compartment and in vertically spaced relation to the couch within said compartment.

4. Apparatus as defined in claim 3 wherein said second plurality of rails are of a substantially U-shaped cross section, said tables including roller means extending laterally into the sectional openings of said rails to be supported for longitudinal displacement thereby.

5. Apparatus as defined in claim 4 wherein at least one of said second rails in each compartment has a slot opening therein to permit selected removal of a support roller on at least one side of each table.

6. Apparatus as defined in claim 4 wherein each of said tables includes means for inclining the table relative to a normally horizontal axis.

7. A unitized passenger sleeping compartment as defined in claim 1 further including means enclosing the longitudinal sides of said compartment and the end of said compartment opposite the end from which said couch is displaceable.

8. Apparatus as defined in claim 7 including means for at least partially creating an opening in one of the longitudinal sides of each compartment.

9. Apparatus as defined in claim 8 wherein the means for closing the sides of the compartments are fabric, said means for creating at least a partial opening comprising a zipper opening in the fabric.

10. Apparatus as defined in claim 1 further including accessory means mounted within each of said compartments.

* * * * *